United States Patent
Kanai

(10) Patent No.: US 6,233,462 B1
(45) Date of Patent: May 15, 2001

(54) PORTABLE TERMINAL DEVICE FOR AUTOMATICALLY CONTROLLING TRANSMITTING VOICE LEVEL AND CALLING SOUND LEVEL

(75) Inventor: Hidefumi Kanai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/067,607

(22) Filed: Apr. 28, 1998

(30) Foreign Application Priority Data

Apr. 28, 1997 (JP) ................................... 9-111584

(51) Int. Cl.[7] .................................................. H04Q 7/32
(52) U.S. Cl. .................... 455/550; 455/567; 455/355; 455/200.1; 455/569; 455/570; 455/575; 379/390; 379/378; 379/388; 381/57; 381/104
(58) Field of Search ..................................... 455/550, 567, 455/63, 67.3, 570, 575, 90, 296, 569, 355, 200.1; 379/390, 378, 388; 381/57, 104, 107

(56) References Cited

U.S. PATENT DOCUMENTS

| | | | |
|---|---|---|---|
| 4,860,335 | * | 8/1989 | Namekawa ............................ 455/569 |
| 5,448,620 | * | 9/1995 | Gershkovich et al. .............. 455/569 |
| 5,903,853 | * | 5/1999 | Sano ..................................... 455/550 |
| 5,907,823 | * | 5/1999 | Sjoberg et al. ...................... 455/550 |

FOREIGN PATENT DOCUMENTS

| | | |
|---|---|---|
| 2 0 299 507 | 1/1989 | (EP) . |
| 2161047 | 1/1986 | (GB) . |

* cited by examiner

Primary Examiner—Fan Tsang
Assistant Examiner—Keith Ferguson
(74) Attorney, Agent, or Firm—Scully, Scott, Murphy & Presser

(57) ABSTRACT

A comparing unit 18, when a radio unit 1 receives a radio signal, compares an ambient noise level detected by a noise sensor 17 with a preset threshold value. If the ambient noise level is smaller than the threshold value, the comparing unit 18 outputs a set value signal SH, and sets a receiving voice level set value of a receiving voice level setting unit 19 to "SMALL", a transmitting voice level set value of a transmitting voice level setting unit 20 to "LARGE" and a calling sound level set value of a calling sound level setting unit 22 to "SMALL", respectively. By contrast, if the ambient noise level is larger than the ambient noise level, the comparing unit 18 outputs the set value signal SH and sets the receiving voice level set value of the receiving voice level setting unit 19 to "LARGE", the transmitting voice level set value of the transmitting voice level setting unit 20 to "SMALL" and the calling sound level set value of the calling sound level setting unit 22 to "LARGE", respectively.

12 Claims, 6 Drawing Sheets

PORTABLE TERMINAL DEVICE FOR AUTOMATICALLY CONTROLLING TRANSMITTING VOICE LEVEL AND CALLING SOUND LEVEL

BACKGROUND OF THE INVENTION

1. Field of the Invention

The present invention relates to a portable terminal device incorporating a function of automatically controlling a transmitting voice level and a calling sound level.

2. Description of the Related Art

There has hitherto been proposed a portable mobile telephone contrived to detect an ambient noise level and to control a level of a receiving voice from a loudspeaker in accordance with the detected noise level.

FIG. 1 is a block diagram illustrating a portable mobile telephone. Referring to FIG. 1, a noise level detection control circuit 43 detects a level of noise ambient to a user, which is contained in a signal component inputted from a microphone 48. Then, a loudspeaker drive amplifier 44 is controlled corresponding to the thus detected ambient noise level, thus increasing and decreasing a voice level outputted from a loudspeaker 47. More specifically, the noise level detection control circuit 43 increases the voice level outputted from the loudspeaker 47 when the ambient noise level rises, and decreases the voice level outputted from the loudspeaker 47 when the ambient noise level decreases, thereby eliminating an influence of the ambient noises upon the receiving voice level.

On the other hand, in this portable mobile telephone, a voice level detection control circuit 46 judges whether or not a voice of the user is inputted from the microphone 48, and controls a gain of an output signal of the microphone 48 based on a result of this judgement. To be more specific, the gain of the output signal of the microphone 48 is decreased if the voice of the user is not inputted but is increased if inputted, thereby controlling so as not to increase the gain with respect to the noise component in the case of the voice not being inputted.

This type of portable mobile telephone is disclosed in, e.g., Japanese laid-open patent application heisei 2-117228.

This type of portable mobile telephone, however, involves the use of a noise level detection circuit for controlling the receiving voice level and a voice level detection circuit for controlling the transmitting voice level.

SUMMARY OF THE INVENTION

It is a primary object of the present invention, which was made to obviate the problems as described above, to provide an improved portable terminal device.

It is another object of the present invention to provide a portable terminal device capable of controlling a receiving voice level corresponding to an ambient noise level.

It is still another object of the present invention to provide a portable terminal device for controlling not only the receiving voice level but also a transmitting voice level and a call notifying sound level in accordance with a detected ambient noise level.

It is a further object of the present invention to provide a portable terminal device capable of, as will become obvious later on, automatically controlling the transmitting voice level, the receiving voice level and the call notifying sound level.

To accomplish the above objects, according to a first aspect of the present invention, a portable terminal device includes an input unit for inputting a voice, a transmitting unit for transmitting the inputted voice, a call notifying unit for giving a notification of a call when a receiving signal is received, a detecting unit for detecting an ambient noise level, and a sound level control unit for controlling at least one of a transmitting voice level and a calling sound level on the basis of the detected noise level. It is preferable that the detecting unit be a noise sensor provided separately from the input unit. The sound level control unit preferably compares the detected noise level with a predetermined threshold value, and thus controls the level in accordance with a result of the comparison. The portable terminal device preferably further includes a setting unit for setting the threshold value. Moreover, the portable terminal device still further includes a count unit for counting the predetermined time, and the detecting unit detects an ambient noise level at an interval of the predetermined time. The sound level control unit preferably executes the control during a speech and during a receiving process. The portable terminal device is preferably a portable telephone. The sound level control unit, when the detected noise level is smaller than the predetermined threshold value, controls the transmitting voice level to a "LARGE" level and the calling sound level to a "SMALL" level, and, when the detected noise level is larger than the predetermined threshold value, controls the transmitting voice level to the "SMALL" level and the calling sound level to the "LARGE" level. The portable terminal device preferably further includes an output unit for outputting a voice signal received, and a receiving voice level control unit for controlling a receiving voice level, coupled with the control of the transmitting voice level. The portable terminal device preferably further comprises a selecting unit for selecting whether or not the sound level control unit should control the sound level.

According to a second aspect of the present invention, a portable terminal device includes a microphone for inputting a voice, a radio unit for transmitting the inputted voice, a loudspeaker for giving a notification of a call when a receiving signal is received, a noise sensor for detecting an ambient noise level, and a control unit for controlling at least one of a transmitting voice level and a calling sound level on the basis of the detected noise level. The control unit preferably, when the detected noise level is smaller than the predetermined threshold value, controls the transmitting voice level to a "LARGE" level and the calling sound level to a "SMALL" level, and, when the detected noise level is larger than the predetermined threshold value, controls the transmitting voice level to the "SMALL" level and the calling sound level to the "LARGE" level.

According to a third aspect of the present invention, a method of controlling sound level of a portable terminal device, includes the steps of detecting an ambient noise level, and controlling at least one of a transmitting voice level and a calling sound level on the basis of the detected ambient noise level. The method of controlling the sound level of the portable terminal device preferably further includes the steps of inputting a threshold value, comparing the ambient noise level with the threshold value, and controlling, when the ambient noise level is smaller than the threshold value, the transmitting voice level to the "LARGE" level and the calling sound level to the "SMALL" level and, when the ambient noise level is larger than the threshold value, controlling the transmitting voice level to the "SMALL" level and the calling sound level to the "LARGE" level. The method of controlling the sound level of the portable terminal device preferably further includes the steps of receiving a radio signal, controlling the transmitting voice level and the calling sound level on the basis of a result in the above-described comparing step, outputting a calling sound at the controlled calling sound level, counting a first predetermined time, judging whether or not a user operates within the first predetermined time, counting a second predetermined time if the user operates within the first predetermined time, talking at the controlled transmitting voice level, and when counting the second predetermined time upon judging whether or not the second predetermined time is counted, re-detecting the ambient noise level.

According to a fourth aspect of the present invention, a method of controlling a sound level of a portable terminal device, includes the steps of inputting a threshold value, depressing an off-hook button, inputting a number of a co-talker, calling this number, detecting an ambient noise level, comparing the ambient noise level with the threshold value, controlling, when the ambient noise level is smaller than the threshold value, a transmitting voice level to a "LARGE" level, and controlling, the ambient noise level is larger than the threshold value, the transmitting voice level to a "SMALL" level, and talking at the controlled transmitting voice level.

Therefore, according to the present invention, the calling sound level and the transmitting voice level are controlled based on the ambient noise level of the portable terminal device, and hence it is feasible to automatically control the calling sound level and the transmitting voice level that are suited to a using environment of the body of the portable terminal device.

BRIEF DESCRIPTION OF THE DRAWINGS

These and other objects, features and advantages of the invention will become more fully apparent from the following detailed description taken in conjunction with accompanying drawings, in which.

DETAILED DESCRIPTION OF THE PREFERRED EMBODIMENT

Figure 1:
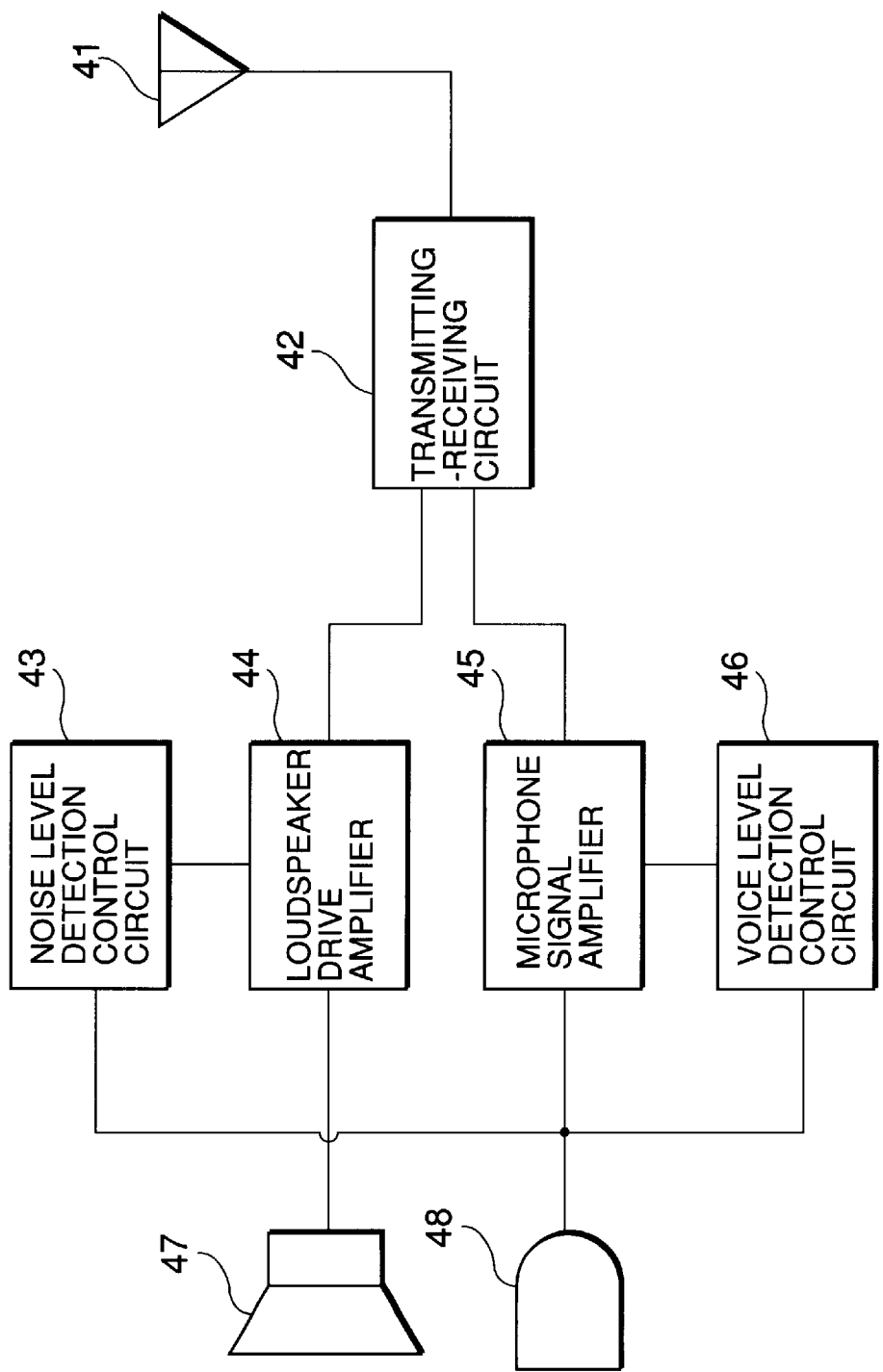
FIG. 1 is a diagram showing one example of a construction of a circuit of a prior art portable terminal device.
Figure 2:
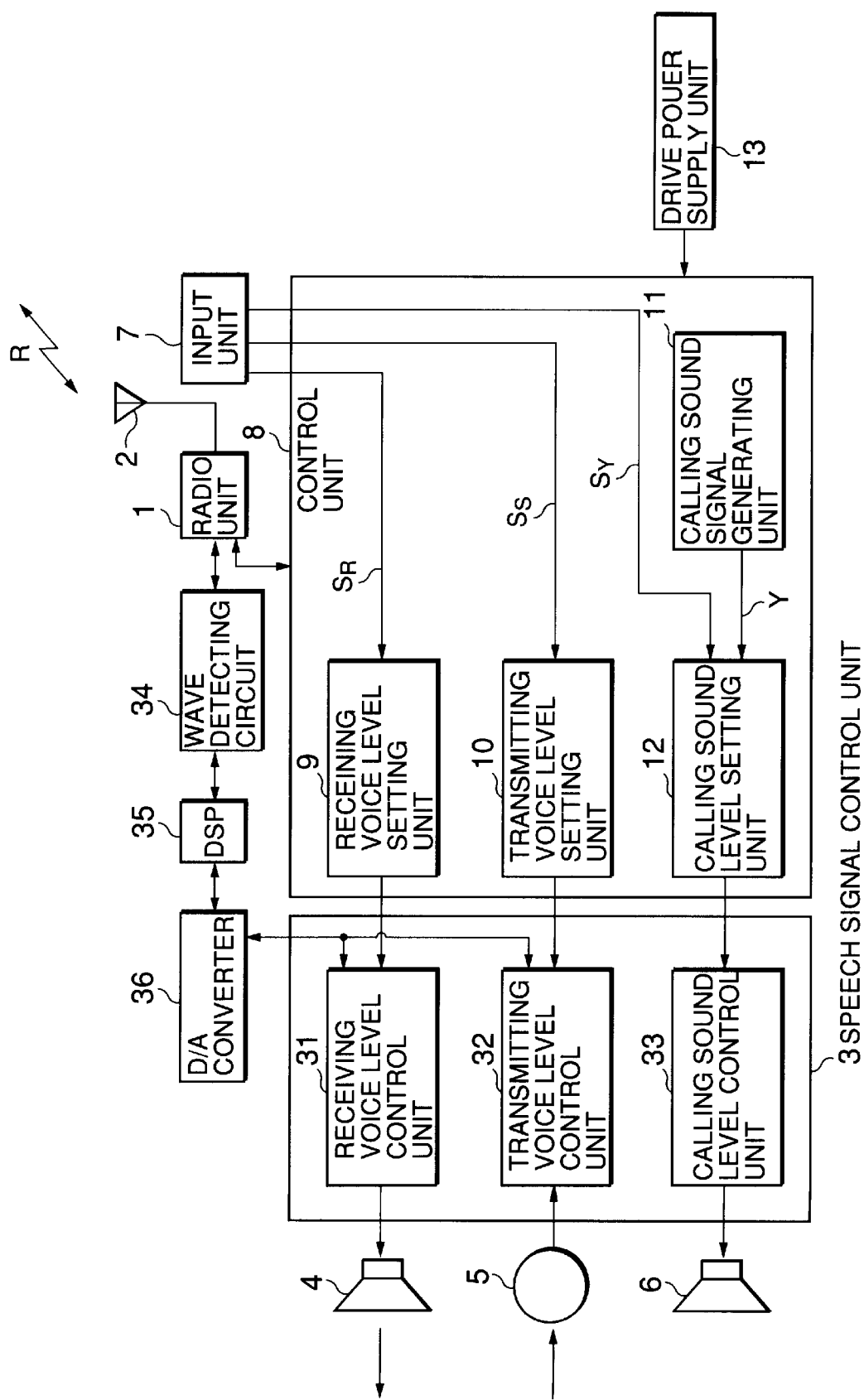
FIG. 2 is a diagram showing one example of a construction of a circuit of a related art portable terminal device.

FIG. 2 shows a portable terminal device contrived to obviate the problems described above.

Referring first to FIG. 2, a radio unit 1 transmits and receives radio waves R to and from an unillustrated base station via an antenna 2. A wave detecting circuit 34 detects a speech signal from the radio waves R transmitted from the base station, and demodulates this signal. A digital signal processor (DSP) 35 converts the detected speech signal into a digital signal. A D/A converter 36 converts the digital signal outputted from the DSP 35 into an analog signal. A speech signal control unit 3 includes a receiving sound level control unit 31, a transmitting voice level control unit 32 and a calling sound level control unit 33. The receiving voice level control unit 31 controls a level of the receiving voice outputted from a receiver 4. The transmitting voice level control unit 32 controls a level of the transmitting voice inputted from a transmitter 5. A calling sound level control unit 33 controls a level of the calling sound outputted from a loudspeaker 6.

An input unit 7 is constructed of a receiving voice level operator used for setting the receiving voice level, a transmitting voice level operator used for setting the transmitting voice level, and a calling sound level operator used for setting the calling sound level. Further, the input unit 7 outputs a receiving voice level setting signal SR, a transmitting voice level setting signal SS and a calling sound level setting signal SY, which correspond to user's manipulations of the respective operations.

A control unit 8 has a receiving voice level setting unit 9, a transmitting voice level setting unit 10 and a calling sound level setting unit 12, and controls the receiving voice level, the transmitting voice level and the calling sound level. The receiving voice level setting unit 9 sets, in the receiving voice level control unit 31, a receiving voice level set value obtained from the receiving voice level setting signal SR outputted from the input unit 7. The transmitting voice level setting unit 10 sets in the transmitting voice level control unit 32 a transmitting voice level set value obtained from the transmitting voice level setting signal SS outputted from the input unit 7. The calling sound level setting unit 12 sets in the calling sound level control unit 33 a calling sound level set value obtained from the calling sound level setting signal SY outputted from the input unit 7. A calling sound signal generating unit 11 generates a calling sound signal Y upon inputting a receiving signal from the radio unit 1.

A drive power supply unit 13 supplies the respective units in the control unit 8.

In the thus constructed portable terminal device, if there are loud ambient noises, the user becomes hard to listen to the calling sound and the receiving voice, and a person to whom the user speaks also becomes hard to hear the voice of the user. At this time, the user manipulates each of the calling sound level operator and the receiving voice level operator of the input unit 7 so as to increase each of the calling sound level set value and the receiving voice level set value. Further, the user manipulates the transmitting voice level operator of the input unit 7 to decrease the transmitting voice level set value. Thus, there rises each of the levels of the co-talker voice outputted from the receiver 4 and of the calling sound outputted from the loudspeaker 6, and also there decreases the level of the transmitting voice through the present portable terminal device, which is outputted from the receiver of the co-talker terminal device.

On the other hand, if the using environment of the portable terminal device is quiet, and if the ambient noises are very low, the user feels the calling sound and the receiving voice noisy. Further, under such quiet environment, the user in most cases might speak in a low voice in consideration of nuisances for the third party, and hence the co-talker is by contrast hard to listen to the voice of the user. At this time, the user manipulates respectively the calling sound level operator and the receiving voice level operator of the input unit 7 in order to reduce the calling sound level set value and the receiving voice level set value respectively. Moreover, the user manipulates the transmitting voice level operator of the input unit 7 in order to increase the transmitting voice level set value. Each of the levels of the co-talker voice outputted from the receiver 4 and of the calling sound outputted from the loudspeaker 6, is thus reduced, and the level of the transmitting voice of the present portable terminal device outputted from a receiver of a co-talker's terminal device is increased.

In this portable terminal device, however, every time the using environment changes, i.e., each time the level of the ambient environment noises changes, the user must manipulate individually the calling sound level operator, the receiving voice level operator and the transmitting voice level operator of the input unit 7, and consequently there arises a problem in which such manipulations are extremely troublesome. Further, the user normally speaks holding the portable terminal device, and therefore, if the receiving voice operator, the transmitting voice level operator and the calling sound level operator, of the input unit 7, for controlling the respective voice levels are provided in the vicinity of the receiver 4, the problem is a visual inconvenience such as being unable to recognize where each of the operators exists.

Next, a construction of the circuit of the portable terminal device, more specifically, the portable telephone according to the present invention will be discussed by way of one preferred example with reference to FIG. 3.

Figure 3:
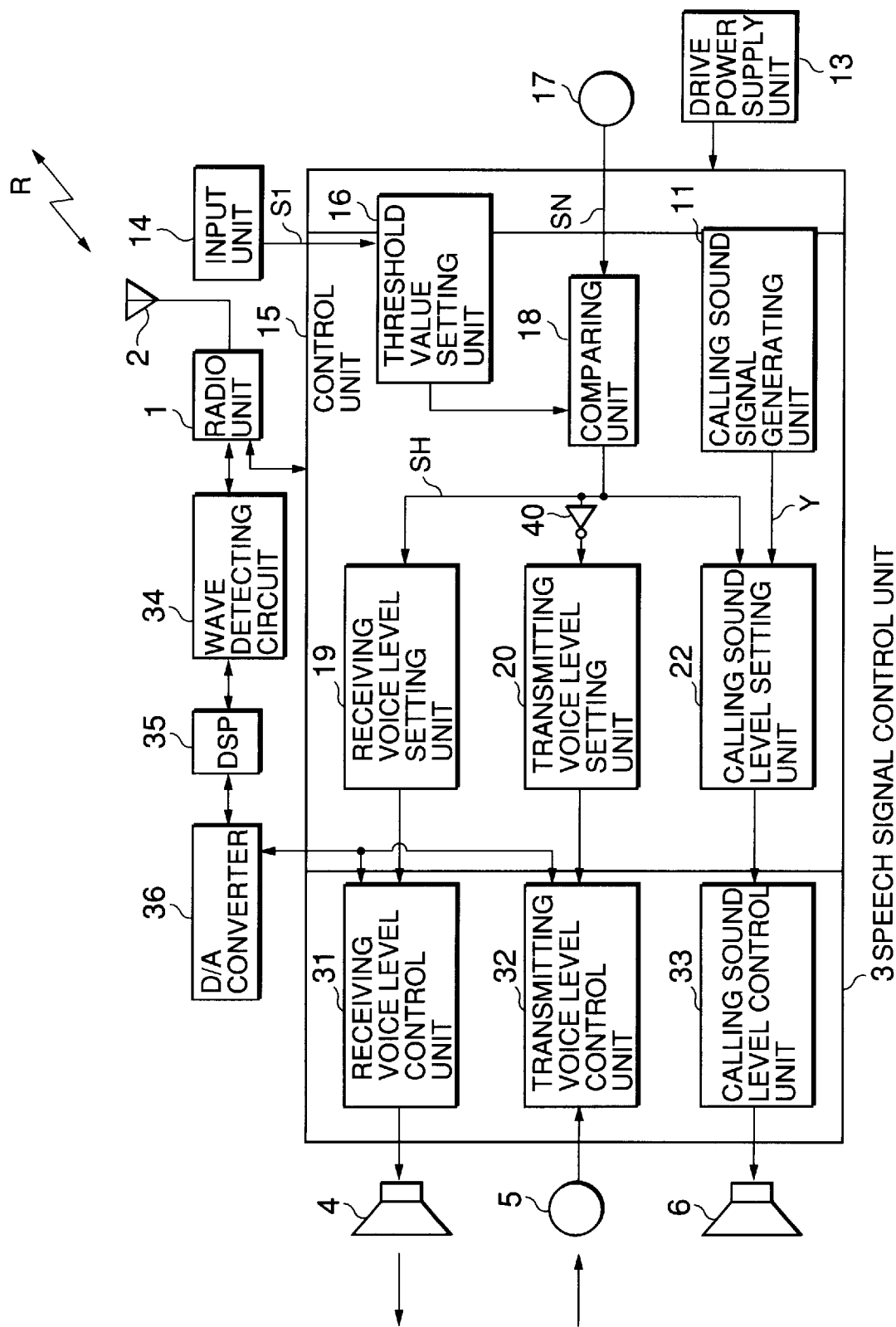
FIG. 3 is a diagram showing one example of a preferable construction of a circuit of a portable terminal device according to the present invention.

Referring to FIG. 3, the radio unit 1 transmits and receives the radio waves R to and from the unillustrated base station via the antenna 2. The wave detecting circuit 34 detects the speech signal from the radio waves R transmitted from the base station, and demodulates this signal. The digital signal processor (DSP) 35 converts the detected speech signal into a digital signal. The D/A converter 36 converts the digital signal outputted from the DSP 35 into an analog signal. The speech signal control unit 3 includes the receiving sound level control unit 31, the transmitting voice level control unit 32 and the calling sound level control unit 33. The receiving voice level control unit 31 controls a level of the receiving voice outputted from the receiver 4. The transmitting voice level control unit 32 controls a level of the transmitting voice inputted from the transmitter 5. The calling sound level control unit 33 controls a level of the calling sound outputted from the loudspeaker 6.

The input unit 14, more specifically, a key pad is used when inputting a threshold value. The threshold value is used when compared with a level of the ambient noises of the portable terminal device. The input unit 14, when the threshold value is inputted, outputs a threshold value signal S1. The threshold value is preset by a manufacturer or user inputting through the input unit 14.

A noise sensor 17 detects the level of the ambient noises, and outputs a result of this detection as an ambient noise detection signal SN. A preferable construction is that the noise sensor 17 is provided on the surface opposite to the surface provided with the microphone 5, thereby facilitating the noise detection by the noise sensor 17.

A control unit 15 batchwise controls the receiving voice level, the transmitting voice level and the calling sound level. In the control unit 15, a threshold value setting unit 16 sets a threshold value on the basis of the threshold value signal S1 outputted from the input unit 14. A comparing unit 18 compares the ambient noise level obtained from the ambient noise detection signal SN with the threshold value set by the threshold value setting unit 16 at a timing of a clock given from an unillustrated clock oscillator. The comparing unit 18 outputs a set value signal SH based on a result of the comparison to a receiving voice level setting unit 19 and a calling sound level setting unit 22. Further, the comparing unit 18 outputs the set value signal SH based on a result of the comparison to the calling sound level setting unit 22 via a NOT circuit 40. The set value signal SH is expressed by, e.g., a binary signal, and the comparing unit 18 outputs, if the threshold value is larger than the ambient noise level, the set value signal SH of "1" and outputs, if smaller than the ambient noise level, the set value signal SH of "0". The receiving voice level setting unit 19 sets in a receiving voice level control unit 31 within the speech signal control unit 3, a receiving voice level set value obtained from the set value signal SH outputted by the comparing unit 18. Similarly, a transmitting voice level setting unit 20 sets in a transmitting voice level control unit 32 within the speech signal control unit 3, a transmitting voice level set value obtained from the set value signal SH outputted by the comparing unit 18. Further, a calling sound level setting unit 22 sets in a calling sound level control unit 33 within the speech signal control module 3, a calling sound level set value obtained from the set value signal SH outputted by the comparing unit 18.

A drive power supply unit 13 supplies the respective units of the control unit 8.

Figure 4:
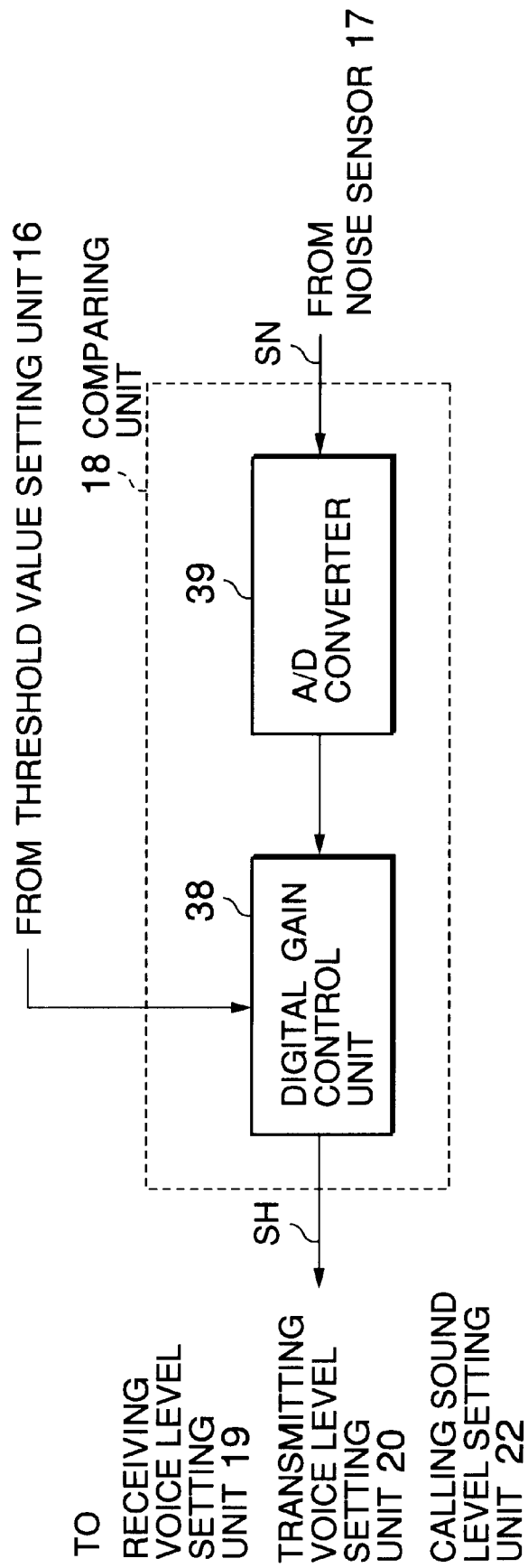
FIG. 4 is a diagram showing a preferable construction of a circuit of a comparing unit 18 illustrated in FIG. 3.

FIG. 4 is a diagram showing a construction of a circuit of the comparing unit 18 shown in FIG. 3 by way of one preferable example.

Referring to FIG. 4, the ambient noise detection signal SN of the analog signals outputted from the noise sensor 17 is converted into a digital signal by an A/D converter 39. The ambient noise detection signal converted into the digital signal is compared with a threshold value set by the threshold value setting unit 16 in accordance with the clock inputted from the unillustrated clock oscillator in a digital gain control unit 38. Then, the digital gain control unit 38 outputs the set value signal SH based on a result of the comparison to the receiving voice level setting unit 19 and the calling sound level setting unit 22 as well. The digital gain control unit 38 further outputs the set value signal SH based on a result of the comparison to the transmitting voice level setting unit 20 via the NOT circuit 40.

Next, an operation when in a receiving process in one preferable example of the portable terminal device illustrated in FIG. 3 will be described in greater detail with reference to FIG. 5.

Figure 5:
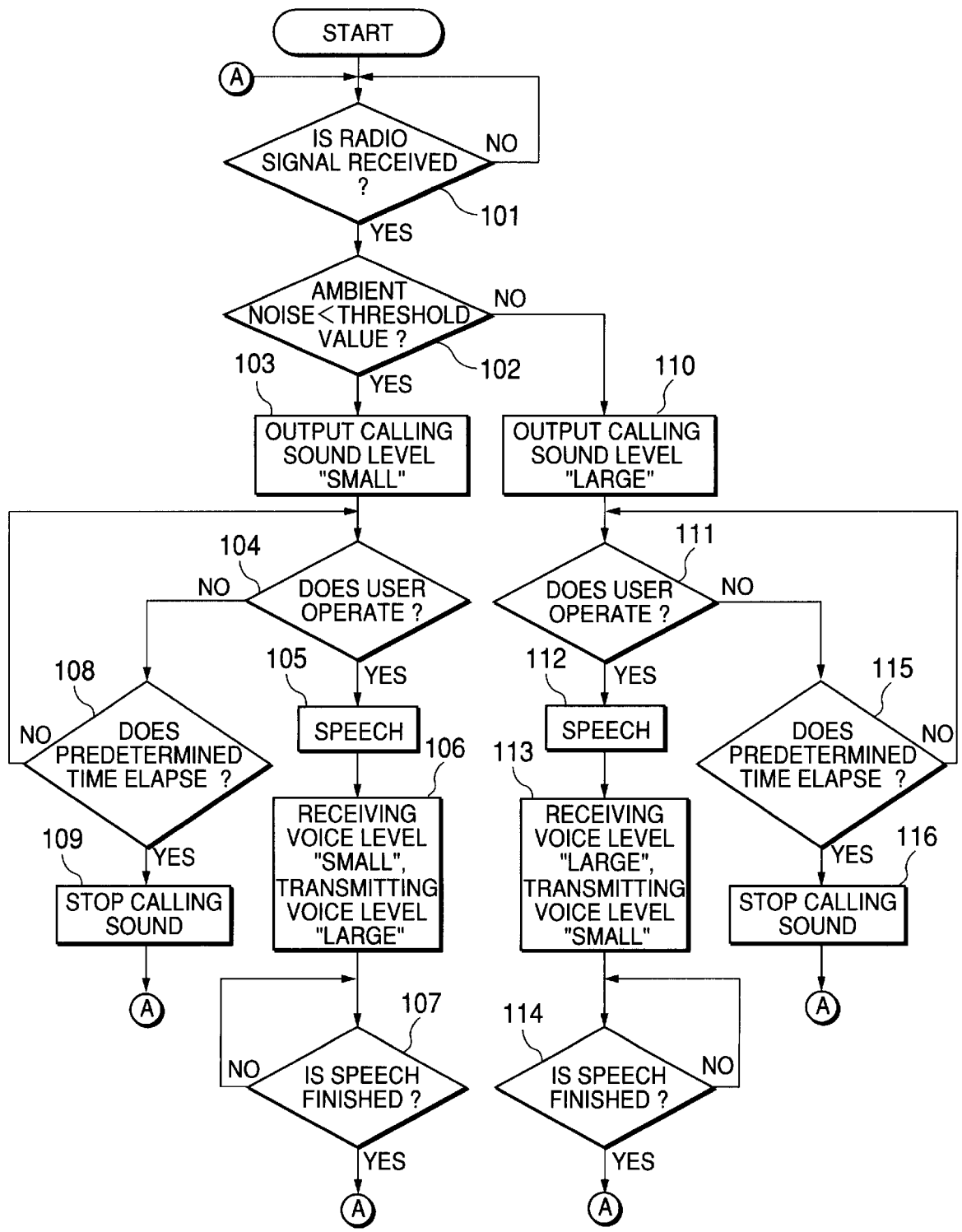
FIG. 5 is an explanatory flowchart showing one preferable example of operation of the portable terminal device shown in FIG. 3 when in a receiving process.

Referring to FIG. 5, when the radio unit 1 receives the radio signal (YES in S101), the comparing unit 18 within the control module 15 compares the ambient noise level based on the ambient noise detection signal SN outputted from the noise sensor 17 with the threshold value, e.g., 10 preset by the threshold value setting unit 16 by operating the input unit 14 (S102).

When the ambient noise level based on the ambient noise detection signal SN outputted from the noise sensor 17 is, e.g., "5", i.e., if the ambient noise level is smaller than the threshold value of "10" (YES in S102), the comparing unit 18 outputs the set value signal SH indicating that the ambient noise level is smaller than the threshold value. The receiving voice level setting unit 19, the transmitting voice level setting unit 20 and the calling sound level setting unit 22 respectively set a receiving voice level set value to "SMALL", a transmitting voice level set value to "LARGE" and a calling sound level set value to "SMALL" on the basis of the set value signal SH. The calling sound level control unit 33 outputs from the loudspeaker 6 a calling sound exhibiting a level corresponding to "SMALL" of the calling sound level set value set by the calling sound level setting unit 22. Accordingly, the calling sound exhibiting the small level is outputted from the loudspeaker 6 (S103).

Next, whether or not the user depresses an unillustrated off-hook button within a predetermined time in response to the small-level calling sound outputted from the loudspeaker 6, is judged (S104). The user depresses an unillustrated off-hook button within the predetermined time in response to the calling sound (YES in S104), thereby enabling the caller and the user to talk to each other (S105).

At this time, the voice of the caller is received by the radio unit 1 via the antenna 2, and the speech signal corresponding to the voice of the caller is outputted to the speech signal control module 3. Then, the receiving voice level control unit 31 in the speech signal control module 3 outputs from the receiver 4 the speech signal assuming a level corresponding to "SMALL" of the receiving voice level set value set by the receiving voice level setting unit 19. Accordingly, the small-level voice of the co-talker is outputted from the receiver 4 (S106).

On the other hand, the voice uttered from the user is outputted to the transmitting voice level control unit 32 from the transmitter 5. The transmitting voice level control unit 32 in the speech signal control unit 3 outputs to the radio unit 1 the speech signal assuming a level corresponding to "LARGE" of the transmitting voice level set value set by the transmitting voice level setting unit 22. Then, the radio unit 1 modulates the inputted speech signal, and transmits the modulated signal in the form of the radio wave R to the unillustrated base station through the antenna 2. The radio wave R is inputted to the terminal device of the caller via an unillustrated network. Hence, the voice having the level corresponding to the receiving voice level set value set by the receiving voice level setting unit 9 of the present portable telephone, is outputted from the receiver of the terminal device of the caller (S106).

Thereafter, whether the speech is finished or not is judged (S107), and, if it is judged that the speech is ended up with depressing the unillustrated on-hook button (YES in S107), the processing returns again to the standby status (S101).

Further, in the process in step S104, if the user performs no operation (NO in S104) after outputting the calling sound, and when a predetermined time, e.g., 15 sec elapses (YES in S108), the calling sound from the loudspeaker 6 is stopped (S109), and the processing goes back to the standby status (S101).

On the other hand, when the ambient noise level based on the ambient noise detection signal SN outputted from the noise sensor 17 is, e.g., "15", viz., when the ambient noise level is larger than the threshold value of "10" (NO in S102), the comparing unit 18 outputs the set value signal SH indicating that the ambient noise level is larger than the threshold value. The receiving voice level setting unit 19, the transmitting voice level setting unit 20 and the calling sound level setting unit 22 respectively set the receiving voice level set value to "LARGE", the transmitting voice level set value to "SMALL" and the calling sound level set value to "LARGE" on the basis of the set value signal SH. The calling sound level control unit 33 outputs from the loudspeaker 6 the calling sound exhibiting a level corresponding to "LARGE" of the calling sound level set value set by the calling sound level setting unit 22. Accordingly, the calling sound exhibiting the large level is outputted from the loudspeaker 6 (S110).

Next, whether or not the user depresses the unillustrated off-hook button within a predetermined time in response to the large-level calling sound outputted from the loudspeaker 6, is judged (S111). The user depresses the unillustrated off-hook button within the predetermined time in response to the calling sound (YES in S111), thereby enabling the caller and the user to talk to each other (S112).

At this time, the voice of the caller is received by the radio unit 1 via the antenna 2, and the speech signal corresponding to the voice of the caller is outputted to the speech signal control unit 3. Then, the receiving voice level control unit 31 in the speech signal control unit 3 outputs from the receiver 4 the speech signal assuming a level corresponding to "LARGE" of the receiving voice level set value set by the receiving voice level setting unit 19. Accordingly, the large-level voice of the co-talker is outputted from the receiver 4 (S113).

On the other hand, the voice uttered from the user is outputted to the transmitting voice level control unit 32 from the transmitter 5. The transmitting voice level control unit 32 in the speech signal control unit 3 outputs to the radio unit 1 the speech signal assuming a level corresponding to "SMALL" of the transmitting voice level set value set by the transmitting voice level setting unit 22. Then, the radio unit 1 modulates the inputted speech signal, and transmits the modulated signal in the form of the radio wave R to the unillustrated base station through the antenna 2. The radio wave R is inputted to the terminal device of the caller via the unillustrated network. Therefore, the voice having the level corresponding to the receiving voice level set value set by the receiving voice level setting unit 9 of the present portable telephone, is outputted from the receiver of the terminal device of the caller (S113).

Thereafter, whether the speech is finished or not is judged (S114), and, if it is judged that the speech is ended up with depressing the unillustrated on-hook button (YES in S114), the processing returns again to the standby status (S101).

Further, in the process in step S111, if the user performs no operation (NO in S111) after outputting the calling sound, and when the predetermined time, e.g., 15 sec is measured (YES in S115), the calling sound from the loudspeaker 6 is stopped (S116), and the processing goes back to the standby status (S101).

Next, an operation when in a calling process in one preferable example of the portable terminal device illustrated in FIG. 3 will be described in greater detail with reference to FIG. 6.

Figure 6:
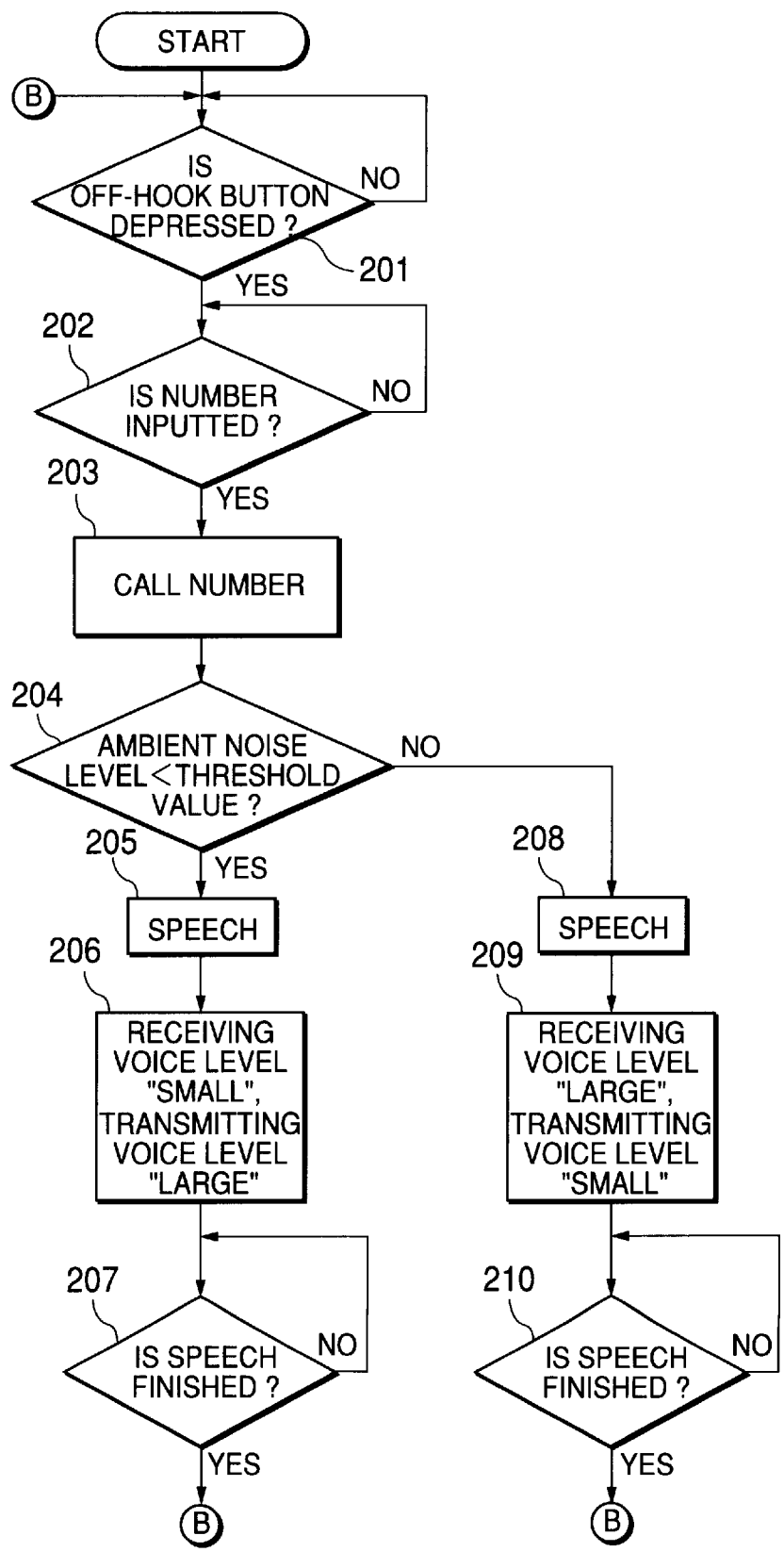
FIG. 6 is an explanatory flowchart showing one preferable example of operation of the portable terminal device illustrated in FIG. 3 when in call-out process.

Referring to FIG. 6, when the user depresses the unillustrated off-hook button (YES in S201) and further a key button of the input unit 14, and thus inputs a telephone number of the co-talker (YES in S202), this telephone number is called out (S203). Then, the comparing unit 18 in the control unit 15 compares the ambient noise level based on the ambient noise detection signal SN outputted from the noise sensor 17 with the threshold value, e.g., "10" preset by the threshold value setting unit 16 by operating the input unit 14 (S204).

When the ambient noise level based on the ambient noise detection signal SN outputted from the noise sensor 17 is, for example, "5", i.e., when the ambient noise level is smaller than the threshold value of "10" (YES in S204), the comparing unit 18 outputs the set value signal SH indicating that the ambient noise level is smaller than the threshold value. The receiving voice level setting unit 19 and the transmitting voice level setting unit 20 respectively set the receiving voice level set value to "SMALL", and the transmitting voice level set value to "LARGE" on the basis of the set value signal SH.

Thereafter, the co-talker identified with the telephone number called depresses the unillustrated off-hook button, thereby enabling the called co-talker and the user to speak to each other (S205).

At this time, the voice of the co-talker is received by the radio unit 1 via the antenna 2, and the speech signal corresponding to the voice of the caller is outputted to the speech signal control module 3. Then, the receiving voice level control unit 31 in the speech signal control module 3 outputs from the receiver 4 the speech signal assuming a level corresponding to "SMALL" of the receiving voice level set value set by the receiving voice level setting unit 19. Accordingly, the small-level voice of the co-talker is outputted from the receiver 4 (S206).

Moreover, the voice uttered from the user is outputted to the transmitting voice level control unit 32 from the transmitter 5. The transmitting voice level control unit 32 in the speech signal control module 3 outputs to the radio unit 1 the speech signal assuming a level corresponding to "LARGE" of the transmitting voice level set value set by the transmitting voice level setting unit 22. Then, the radio unit 1 modulates the inputted speech signal, and transmits the modulated signal in the form of the radio wave R to the unillustrated base station through the antenna 2. The radio wave R is inputted to the terminal device of the caller via the unillustrated network. Therefore, the voice having the level corresponding to the receiving voice level set value set by the receiving voice level setting unit 9 of the present portable telephone, is outputted from the receiver of the terminal device of the co-talker (S206).

Thereafter, whether the speech is finished or not is judged (S207), and, if it is judged that the speech is ended up with depressing the unillustrated on-hook button (YES in S207), the processing returns again to the standby status (S201).

On the other hand, when the ambient noise level based on the ambient noise detection signal SN outputted from the noise sensor 17 is, for example, "15", i.e., when the ambient noise level is larger than the threshold value of "10" (NO in S204), the comparing unit 18 outputs the set value signal SH indicating that the ambient noise level is larger than the threshold value. The receiving voice level setting unit 19 and the transmitting voice level setting unit 20 respectively set the receiving voice level set value to "LARGE", and the transmitting voice level set value to "SMALL" on the basis of the set value signal SH.

Thereafter, the co-talker identified with the telephone number called depresses the unillustrated off-hook button, thereby enabling the called co-talker and the user to speak to each other (S208).

At this time, the voice of the co-talker is received by the radio unit 1 via the antenna 2, and the speech signal corresponding to the voice of the co-talker is outputted to the speech signal control unit 3. Then, the receiving voice level control unit 31 in the speech signal control unit 3 outputs from the receiver 4 the speech signal assuming a level corresponding to "LARGE" of the receiving voice level set value set by the receiving voice level setting unit 19. Accordingly, the large-level voice of the co-talker is outputted from the receiver 4 (S209).

Moreover, the voice uttered from the user is outputted to the transmitting voice level control unit 32 from the transmitter 5. The transmitting voice level control unit 32 in the speech signal control unit 3 outputs to the radio unit 1 the speech signal assuming a level corresponding to "SMALL" of the transmitting voice level set value set by the transmitting voice level setting unit 22. Then, the radio unit 1 modulates the inputted speech signal, and transmits the modulated signal in the form of the radio wave R to the unillustrated base station through the antenna 2. The radio wave R is inputted to the terminal device of the caller via the unillustrated network. Therefore, the voice having the level corresponding to the receiving voice level set value set by the receiving voice level setting unit 9 of the present portable telephone, is outputted from the receiver of the terminal device of the co-talker (S209).

Thereafter, whether the speech is finished or not is judged (S210), and, if it is judged that the speech is ended up with depressing the unillustrated on-hook button (YES in S210), the processing returns again to the standby status (S201).

As discussed above, according to the present invention, the calling sound level and the transmitting voice level are controlled based on the level of the noises ambient to the portable terminal device, and it is therefore feasible to automatically control the calling sound level and the transmitting voice level, which are suited to the using environment of the body of the portable terminal device.

In the embodiment discussed above, the user or the manufacturer sets one threshold value inputted from the input unit 14, however, this threshold value is not limited to the single but may be set to any number of values. However, as the number of threshold values becomes larger, there increase the receiving voice level, the transmitting voice level and the calling sound level, which can be set. Hence, it is preferable to set the larger number of threshold values.

Further, in the embodiment discussed above, the noise sensor detects the ambient noise level when receiving the radio signal during the receiving process and detects it when calling out the inputted telephone number during the call-out process. This detection timing is not, however, limited to anything, and the ambient noise level may be detected at all times. During the speech, similarly, there is no necessity for detecting the ambient noise level at an interval of the predetermined time, and the ambient noise level may be always detected.

Moreover, in the embodiment discussed above, the receiving voice level, the transmitting voice level and the calling sound level are automatically controllable based on the ambient noise level. There must be no problem at all if the user is allowed to select this automatic control and a manual control by the user himself or herself. In this case, however, a switch for selecting these modes may also be additionally needed.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A portable terminal device comprising:
   means for inputting a voice;
   transmitting means for transmitting the inputted voice;
   call notifying means for giving a notification of a call when a receiving signal is received;
   detecting means for detecting an ambient noise level proximate said portable terminal device; and
   sound level control means for controlling at least one of a transmitting voice level and a calling sound level on the basis of the detected noise level;
   wherein said sound level control means, when the detected noise level is smaller than the predetermined threshold value, controls the transmitting voice level to a "LARGE" level and the calling sound level to a "SMALL" level, and, when the detected noise level is larger than the predetermined threshold value, controls the transmitting voice level to the "SMALL" level and the calling sound level to the "LARGE" level.

2. The portable terminal device as claimed in claim 1, wherein said detecting means is a noise sensor provided separately from said input means.

3. The portable terminal device as claimed in claim 1, wherein said sound level control means compares the detected noise level with a predetermined threshold value, and thus controls the level in accordance with a result of the comparison.

4. The portable terminal device as claimed in claim 3, further comprising:

setting means for setting the threshold value.

5. The portable terminal device as claimed in claim 1, wherein said detecting means detects an ambient noise level at an interval of a predetermined time.

6. The portable terminal device as claimed in claim 5, wherein said sound level control means executes the control during a speech and during a receiving process.

7. The portable terminal device as claimed in claim 1, wherein said portable terminal device is a portable telephone.

8. The portable terminal device as claimed in claim 7, further comprising:

output means for outputting a voice signal received; and receiving voice level control means for controlling a receiving voice level, coupled with the control of the transmitting voice level.

9. The portable terminal device as claimed in claim 1, further comprising:

selecting means for selecting whether or not said sound level control means should control the sound level.

10. A portable terminal device comprising:

a microphone for inputting a voice;

a transmitter for transmitting the inputted voice;

a loudspeaker for giving a notification of a call when a receiving signal is received;

a noise sensor for detecting an ambient noise level proximate said portable terminal device; and a control unit for controlling at least one of a transmitting voice level and a calling sound level on the basis of the detected noise level;

wherein said control unit, when the detected noise level is smaller than the predetermined threshold value, controls the transmitting voice level to a "LARGE" level and the calling sound level to a "SMALL" level, and, when the detected noise level is larger than the predetermined threshold value, controls the transmitting voice level to the "SMALL" level and the calling sound level to the "LARGE" level.

11. A method of controlling sound level of a portable terminal device, comprising the steps of:

detecting an ambient noise level proximate said portable terminal device;

controlling at least one of a transmitting voice level and a calling sound level on the basis of the detected ambient noise level;

inputting a threshold value;

comparing the ambient noise level with the threshold value; and controlling, when the ambient noise level is smaller than the threshold value, the transmitting voice level to the "LARGE" level and the calling sound level to the "SMALL" level and, when the ambient noise level is larger than the threshold value, controlling the transmitting voice level to the "SMALL" level and the calling sound level to the "LARGE" level.

12. The method of controlling the sound level of the portable terminal device as claimed in claim 10, further comprising the steps of:

receiving a radio signal;

controlling the transmitting voice level and the calling sound level on the basis of a result in said comparing step;

outputting a calling sound at the controlled calling sound level;

counting a first predetermined time;

judging whether or not a user operates within the first predetermined time; and talking at the controlled transmitting voice level.

* * * * *